UNITED STATES PATENT OFFICE.

CORTLAND W. DAVIS, OF CHICAGO, ILLINOIS, ASSIGNOR TO THE MANTLE LAMP COMPANY OF AMERICA, INCORPORATED, OF CHICAGO, ILLINOIS.

PROCESS OF MANUFACTURING THORIUM NITRATE.

1,368,243.     Specification of Letters Patent.     Patented Feb. 15, 1921.

No Drawing.     Application filed September 16, 1918. Serial No. 254,309.

*To all whom it may concern:*

Be it known that I, CORTLAND W. DAVIS, a citizen of the United States, residing at Chicago, in the county of Cook and State of Illinois, have invented certain new and useful Improvements in Processes of Manufacturing Thorium Nitrate; and I do hereby declare the following to be a full, clear, and exact description of the invention, such as will enable others skilled in the art to which it appertains to make and use the same.

My invention, specifically considered, relates to the separation of thorium from monazite sand and the subsequent refining thereof. The invention is based upon the discovery that when mixtures of rare earth phosphates ($R''' PO_4$) are treated with a strong alkali metal carbonate solution for sometime, thorium is selectively separated from the mixture of phosphates.

This discovery is of great value in the separation and recovery of thorium, as the treatment is applicable early in the process of thorium refining, and eliminates the necessity of carrying as heretofore required a bulky mass of chemicals before the completion of the thorium separation and isolation of the phosphates.

Alkali metal carbonates, and more especially sodium carbonate, have been used heretofore for making thorium separations from mixtures of rare earth metals, but the separations have been based upon the fact that the rare earths being treated are in the form of hydrates, or oxalates which are easy of separation.

It has been proposed to fuse mixed phosphates of rare earths with an alkali metal carbonate, and to then treat the melt with water to dissolve the sodium phosphate thus formed, and leave the rare earths as insoluble oxids. This operation is an expensive one in view of the fact that all of the phosphates are treated with carbonate and the carbonate is itself destroyed when the converted rare earths are changed to oxids. This process provides a means of eliminating the phosphates, but does not selectively separate the rare earths.

In my process, the mixed rare earth phosphates are added to a strong hot solution of alkali metal carbonate, such as sodium carbonate. The thorium phosphate is converted into a soluble carbonate and the sodium forms sodium phosphate, the non-thorium metals being only slightly affected in this boiling operation. The filtrate from this solution contains principally dissolved thorium carbonate and sodium phosphate. Thorium is easily separated from this solution by the addition of sodium hydroxid in sufficient quantity to precipitate the thorium as a hydroxid. The thorium hydroxid is then filtered out and washed free from sodium phosphate, sodium carbonate and excess sodium hydroxid. Thus, by a simple operation, thorium has been selectively separated from its associated rare earth prosphates and obtained in hydroxid form, and free from phosphate. The product thus obtained is of sufficient richness in thorium to be subjected immediately to subsequent purifying processes.

The first step in the refining of thorium, consists in fluxing or digesting monazite sand with hot concentrated sulfuric acid, and thereby forming soluble sulfates of the rare earths (such as thorium, cerium and lanthanum) and phosphoric acid, the non-phosphatic ingredients being usually unattacked by the acid. The product is in the form of a pasty mass to which sufficient water is added to take the same into solution.

All of the rare earth phosphates require a certain amount of acid to cause them to remain in solution, rare earth phosphates being ordinarily insoluble compounds which are rendered soluble if the medium is sufficiently acid. Neutralization of the acid of the solution necessarily compels precipitation of the rare earths as phosphates.

The range of solubility of the several rare earth phosphates, in acid solution, is very slight, and it is therefore impracticable, in commerical practice, to make a direct separation of thorium by fractionation alone. To make a process of separation successful, the yield must be approximately quantitative. In carrying out my process, I, therefore, first produce a concentrated mass of rare earth phosphates containing substantially all of the thorium phosphate of the original mass of monazite sand. This fractionation, as I have termed it, is not a process for the separation of thorium, as such, but is a process of concentration whereby the thorium as a phosphate is now found in a much smaller mass of material, the eliminated materials being composed of non-thorium substances.

The second stem of my process consists in separating the fraction thus obtained from the solution, and treating it with a strong hot solution of carbonate of sodium, from which solution the thorium may be obtained in the form of a soluble carbonate, the sodium phosphate formed by the reaction being also present in the solution. The thorium carbonate and the sodium phosphate may then be removed by filtration.

Recovery of the thorium is effectuated by the addition of sodium hydroxid in sufficient quantity to precipitate the thorium as a hydroxid, which hydroxid is then separated from the solution and washed to relieve it of impurities.

Properly carried out, the operation yields a hydrate of thorium which is of sufficient purity to be immediately subjected to purifying operations. However, it may be desirable to subject this hydrate of thorium to a further treatment with strong hot sodium carbonate in solution (the process being similar to the above described process of treating the mixed phosphates), in order to still further purify the product.

The application of the invention may be illustrated by the following detailed description of a treatment of a sample of monazite sand:

Heat 100 grams of monazite sand for four or five hours with 200 grams of concentrated sulfuric acid, or until such time as all of the monazite is converted into soluble sulfates. The pasty mixture of sulfates, thus formed, is allowed to cool and is afterward dissolved in one liter of cold water, the insoluble matter such as silica, rutile, and other unattacked minerals being filtered out. A solution is thus obtained in which the ratio of thorium to the other rare earth metals is approximately 1 to 12, depending upon the grade of monazite sand used. This solution contains also 1 gram of original sand to each 10 c. c. of volume. The acidity of the solution will be approximately 2.80 normal, the percentage varying with the amount of acid lost in treating the sand.

The next operation consists in reducing the mass so that the ratio of the thorium to the mass is about 1 to 2. The operation is performed by what is known as "fractioning," and consists in neutralizing and diluting the monazite solution and forming a partial precipitate which contains approximately the thorium content of the monazite sand. The fractionation, as already stated, is based upon the fact that neutralization of the acid of the solution compels precipitation of the rare earths as phosphates. Thorium is more basic than the other rare earths and has a tendency to precipitate in advance of the precipitation of the associated phosphatic substances; but it has been found in practice that only about one-half of the thorium content, free from other metals, may be precipitated. The process might be terminated at this point, if it were not too wasteful to do so, it being necessary to obtain nearly all of the fractionated thorium from the solution. In consequence of this the neutralization or dilution is carried further in order to secure precipitation of a much larger percentage of the thorium.

The neutralization or dilution should be gradual, the monazite solution being agitated at the same time in order to cause a thorough diffusion of the liquid. The acidity of the solution may be reduced, but not to the extent to form a precipitate, by the addition of sodium carbonate or other alkali solution. Dilution which follows partial neutralization is produced by the addition of water in sufficient quantity to reduce the acidity of the solution in a degree to form the precipitate of thorium phosphate.

The fractionation process, thus described, should yield a product of mixed phosphates containing ninety per cent. or more of the total thorium content of the monazite, and which in itself is at least fifty per cent. thorium phosphate. The object in making a fractionation is to eliminate as much as possible of the non-thorium metals, and at the same time retain as much as possible of the thorium.

In some cases it may be necessary to refraction the products of the original fractionation by dissolving it in sulfuric acid, and subjecting it to the further steps above mentioned.

My invention becomes usable when a satisfactory fraction has been obtained, although I have found that a strong boiling solution of alkali metal carbonate will selectively dissolve thorium, even when working upon a total mass of phosphates obtained by complete precipitation of the monazite solution. However, the factory operations are greatly facilitated if the monazite solution is properly fractioned, and the resultant fraction contains only one-half non-thorium phosphates. I prefer to use sodium carbonate on account of the cheapness of the material. A solution may be prepared by using three parts by weight of water, to one part by weight of sodium carbonate, although I have found that more dilute solutions will be effective in dissolving the thorium. It is not necessary to dry the phosphate fraction before putting it into the sodium carbonate solution, and it is preferred to leave the fraction in a wet condition. After treating the fraction in a strong hot sodium carbonate solution for some time, the filtrate is removed and the residue tested, said residue being subjected to a further sodium carbonate treatment if it is found that all of the thorium has not been removed. The total filtrates, from this treatment with the sodium carbonate are clarified and sufficient caustic soda solution is added to completely precipitate the thorium content as a hydrate, this hydrate being then separated and washed to remove impurities. It is desirable to subject this hydrate of thorium to a further boiling with sodium carbonate to still further purify the product.

It has been customary to dissolve a fraction of phosphates in hydrochloric or sulfuric acid, and to then precipitate the mass as oxalates by oxalic acid, and to wash these oxalates to relieve them of any traces of phosphates. These oxalates may then be ignited and dissolved, or dissolved directly in acid to form a solution from which the thorium may be separated by any known method. The oxalates have also been converted into hydrates by treating with sodium or potassium hydrate, and the thorium separation subsequently made. However, it has heretofore required two distinct chemical processes to eliminate the phosphates and make a thorium separation.

It will be seen that the new process, herein described, makes it possible to obtain a thorium separation early in the process, and at a great saving in cost of chemicals and labor, the one process performing both functions of selectively separating thorium and eliminating phosphates.

The filtrate obtained from boiling the phosphates of rare earths with alkali metal carbonates, contains all of the carbonates used in the process, either uncombined in original form or with thorium. If sodium carbonate is used, when sodium hydroxid is added to the filtrate, it precipitates the thorium, all of the carbonate is left in the filtrate in the form of sodium carbonate, from which it may be largely recovered by fractional crystallization, thereby reducing the cost for chemicals to a very negligible amount, namely, the cost of the thorium hydroxid used to precipitate the sodium hydrate.

Experiments have shown that strong solutions of potassium carbonate and ammonium carbonate are effective in selectively dissolving thorium. However, sodium carbonate is far the most desirable for this work, because of its comparative cheapness.

When in the claims I refer to "alkali-metal carbonate", I mean to include ammonium carbonate.

What I claim as new and desire to secure by Letters Patent is:

1. The process of separating a rare earth metal from a mixture containing the same, which consists in subjecting the mixture to alkali-metal carbonate treatment, in the presence of a phosphatic radical.

2. The process of separating rare earth metal phosphates which consists in subjecting a mixture of said earth metal phosphates to alkali-metal carbonate treatment.

3. The process which consists in subjecting rare earth metal phosphates to a hot solution of alkali carbonate.

4. The process which consists in subjecting rare earth metal phosphates to a hot solution of sodium carbonate.

5. A method of selectively separating thorium from phosphate mixtures of rare earths containing thorium phosphate, which consists in subjecting the phosphates to the selective action of an alkali metal carbonate without changing the non-thorium phosphates.

6. The process of treating rare earth metal phosphates containing thorium phosphate, which consists in subjecting the phosphates to the action of a strong hot solution of a carbonate of the alkali group and thereby forming a soluble thorium carbonate.

7. The method of converting thorium phosphate into soluble thorium carbonate which consists in treating the thorium phosphate with a sodium carbonate solution.

8. The method of refining thorium from monazite sand, consisting in treating the phosphates of said monazite with a concentrated carbonate of the alkali group to produce a substantially selective separation of the thorium content of said monazite.

9. The method of separating thorium consisting in treating the mixed phosphates of rare earth metals with strong alkali carbonate to form soluble thorium carbonate, and the subsequent recovery of the thorium as a hydrate.

10. The method of eliminating other phosphates from thorium phosphates, which consists in subjecting the thorium phosphates to the action of an alkali-metal carbonate solution.

11. The method of eliminating other phosphates from thorium phosphates and coincidentally separating thorium from rare-earth metals, which consists in subjecting phosphatic rare-earths containing thorium phosphate to the action of an alkali-metal carbonate solution.

12. The process of manufacturing thorium from monazite sand, which consists in treating the phosphatic fraction from said monazite in a strong sodium carbonate solution to form soluble thorium carbonate, and recovering thorium as a hydrate and also the sodium carbonate.

13. The process of converting thorium phosphate into thorium carbonate, which consists in subjecting the thorium phosphate to an aqueous solution, of an alkali-metal carbonate in the presence of other rare earth metal phosphates.

14. The process of converting thorium phosphate into soluble thorium carbonate, which consists in subjecting the thorium phosphate, while in the presence of other rare earth metal phosphates, to the action of an alkali-metal carbonate in solution which does not react with said other rare earth metal phosphates.

In testimony whereof I affix my signature.

CORTLAND W. DAVIS.

Witnesses:
C. A. McJohnston,
James A. Hoyt.